US008803746B2

(12) United States Patent
Matsushita et al.

(10) Patent No.: US 8,803,746 B2
(45) Date of Patent: Aug. 12, 2014

(54) PORTABLE DEVICE WITH A FIRST AND SECOND HOUSING WITH AN ELECTRICALLY INSULATED ANTENNA

(75) Inventors: Shinya Matsushita, Yokohama (JP); Daisuke Mihara, Kawasaki (JP); Takashi Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 212 days.

(21) Appl. No.: 13/426,798

(22) Filed: Mar. 22, 2012

(65) Prior Publication Data

US 2012/0249379 A1 Oct. 4, 2012

(30) Foreign Application Priority Data

Mar. 30, 2011 (JP) ................................. 2011-076337

(51) Int. Cl.
*H01Q 1/24* (2006.01)
(52) U.S. Cl.
USPC ...................................... 343/702; 361/679.28
(58) Field of Classification Search
USPC ...................................... 343/702; 361/679.28
See application file for complete search history.

(56) References Cited

U.S. PATENT DOCUMENTS

| 7,366,304 | B2 * | 4/2008 | Cromer et al. ................. 380/270 |
| 7,509,143 | B2 * | 3/2009 | Lintern et al. ................. 455/558 |
| 7,852,319 | B2 * | 12/2010 | Hirota ............................ 345/158 |
| 7,916,463 | B2 * | 3/2011 | Aya et al. ................. 361/679.28 |

FOREIGN PATENT DOCUMENTS

| JP | 3027116 U | 5/1996 |
| JP | 2000-174466 A | 6/2000 |
| JP | 2002-232220 A | 8/2002 |

* cited by examiner

*Primary Examiner* — Hoanganh Le
(74) *Attorney, Agent, or Firm* — Maschoff Brennan

(57) ABSTRACT

There is provided a portable device which includes a first housing, a housing member removable from the first housing, where the housing member includes an exposed portion, the exposed portion projecting from the first housing when the housing member is inserted in the first housing, a second housing coupled with the first housing so as to be allowed to be folded on the first housing, the second housing including a wall made of electrical insulating material, and an antenna disposed in the second housing and surrounded partially with the wall, a part of the antenna and the exposed portion facing each other via the wall when the first and second housings are folded on each other.

7 Claims, 16 Drawing Sheets

PORTABLE DEVICE WITH A FIRST AND SECOND HOUSING WITH AN ELECTRICALLY INSULATED ANTENNA

CROSS-REFERENCE TO RELATED APPLICATION

This application is based upon and claims the benefit of priority of the prior Japanese Patent Application No. 2011-076337, filed on Mar. 30, 2011, the entire contents of which are incorporated herein by reference.

FIELD

The embodiments discussed herein are related to a portable device.

BACKGROUND

A portable device is known that has a first housing, and a second housing connected to the first housing so as to be able to be superimposed on the first housing (Japanese Laid-open Patent Publication No. 2002-232220, Japanese Registered Utility Model No. 3027116, and Japanese Laid-open Patent Publication No. 2000-17466). Some of the portable devices include an antenna in the second housing. In these portable devices, the wall portion of the second housing surrounding the antenna is formed of insulating material in order to suppress influence on the transmitting and receiving of radio waves by the antenna.

In the superimposed state, the antenna housed in the second housing faces the first housing with the wall portion of the second housing therebetween. Therefore, depending on the material of the first housing, the first housing may exert influence on the receiving sensitivity of the antenna in the superimposed state.

SUMMARY

According to an aspect of the invention, a portable device includes a first housing, a housing member removable from the first housing, the housing member including an exposed portion, the exposed portion projecting from the first housing when the housing member is inserted in the first housing, a second housing coupled with the first housing so as to be allowed to be folded on the first housing, the second housing including a wall made of electrical insulating material, and an antenna disposed in the second housing and surrounded partially with the wall, a part of the antenna and the exposed portion facing each other via the wall when the first and second housings are folded on each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The present invention may provide a portable device in which the reduction of the receiving sensitivity of an antenna is suppressed in a state where first and second housings are superimposed on each other.

DESCRIPTION OF EMBODIMENTS

Figure 1A:
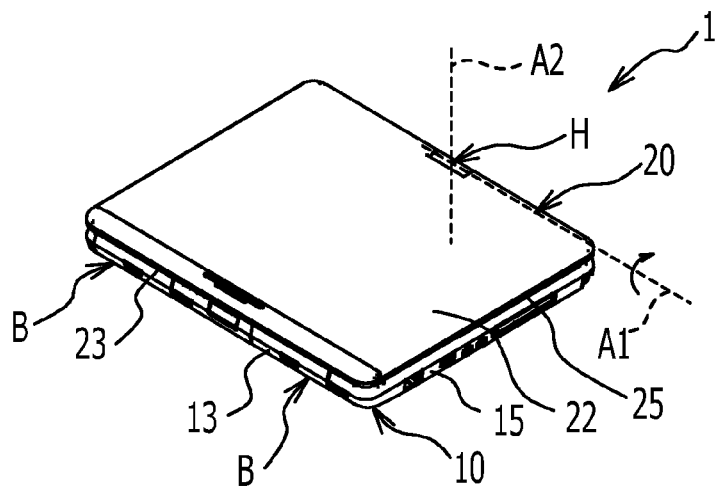
FIGS. 1A to 1C are explanatory views of a notebook computer of this embodiment.
Figure 1B:
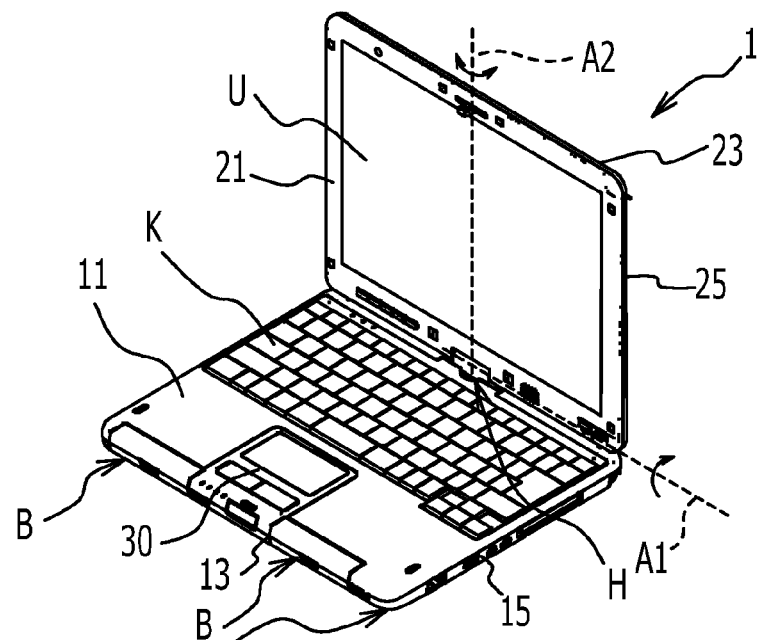
Figure 1C:
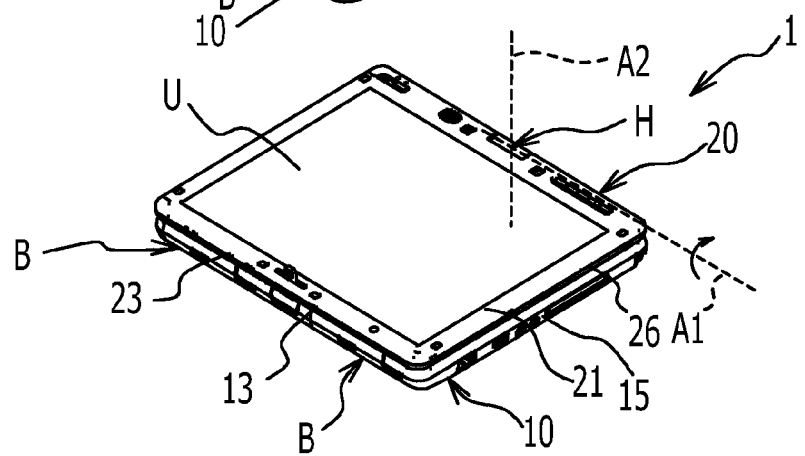

A notebook computer will be described as an example of a portable device. FIGS. 1A to 1C are explanatory views of a notebook computer 1 of this embodiment. The notebook computer 1 has housings 10 and 20. The housing 10 is an example of a first housing. The housing 20 is an example of a second housing. The housings 10 and 20 are connected with a biaxial hinge H. The housing 10 has an upper surface 11, a bottom surface facing the upper surface 11, and side surfaces 13 and 15 that have smaller areas than the upper surface 11 and the bottom surface. The side surfaces 13 and 15 connect the upper surface 11 and the bottom surface. The upper surface 11 of the housing 10 is an example of a third surface. The bottom surface of the housing 10 is an example of a fourth surface. The side surface 13 is an example of a fifth surface. The upper surface 11 is provided with a keyboard K for operating the notebook computer 1, and a cover 30. The side surface 15 is provided with a plurality of ports and connectors. The housing 10 houses a mother board for controlling the overall operation of the notebook computer 1. The housing 10 houses two detachable housing members B. The two housing members B are provided on either side of the cover 30.

The housing 20 has a front surface 21, a back surface 22 facing the front surface 21, and side surfaces 23 and 25 that have smaller areas than the front surface 21 and the back surface 22. The side surfaces 23 and 25 connect the front surface 21 and the back surface 22. The front surface 21 of the housing 20 is an example of a first surface. The back surface 22 of the housing 20 is an example of a second surface. The front surface 21 is provided with a display unit U. The display unit U includes a display panel that may display images, and a touch panel that may be operated by touching. Various types of touch panels, such as a resistive touch panel, a surface acoustic wave touch panel, and an infrared touch panel, may be used as the touch panel. An electrostatic capacitance touch panel may also be used that does not require a stylus pen and that uses the change in the electrostatic capacitance between the user's finger and a conductive film. Instead of the touch panel, an electromagnetic induction pen tablet that is operated with a stylus pen may be used.

The biaxial hinge H connects the housings 10 and 20 rotatably about two different axes A1 and A2. The axes A1 and A2 are perpendicular to each other. The axis A1 extends parallel to the direction in which the longitudinal direction of the upper surface 11 extends. The axis A2 extends in a direction that intersects the upper surface 11. That is to say, the axes A1 and A2 intersect.

FIG. 1A illustrates a first superimposed state where the front surface 21 of the housing 20 is superimposed on the upper surface 11 of the housing 10. FIG. 1B illustrates an open state where the housings 10 and 20 are open. FIG. 1C illustrates a second superimposed state where the back surface 22 of the housing 20 is superimposed on the upper surface 11 of the housing 10. From the first superimposed state, the user rotates the housing 20 about the axis A1, thereby bringing the notebook computer 1 into the open state. From the open state of FIG. 1B, the user rotates the housing 20 about the axis A2 such that the back surface 22 of the housing 20 and the upper surface 11 of the housing 10 face each other. The user may rotate the housing 20 about the axis A1 such that the housing 20 is superimposed on the housing 10 with the back surface 22 of the housing 20 and the upper surface 11 of the housing 10 facing each other. Thus, the notebook computer 1 is brought into the second superimposed state where the upper surface 11 of the housing 10 and the back surface 22 of the housing 20 face each other.

Figure 2:
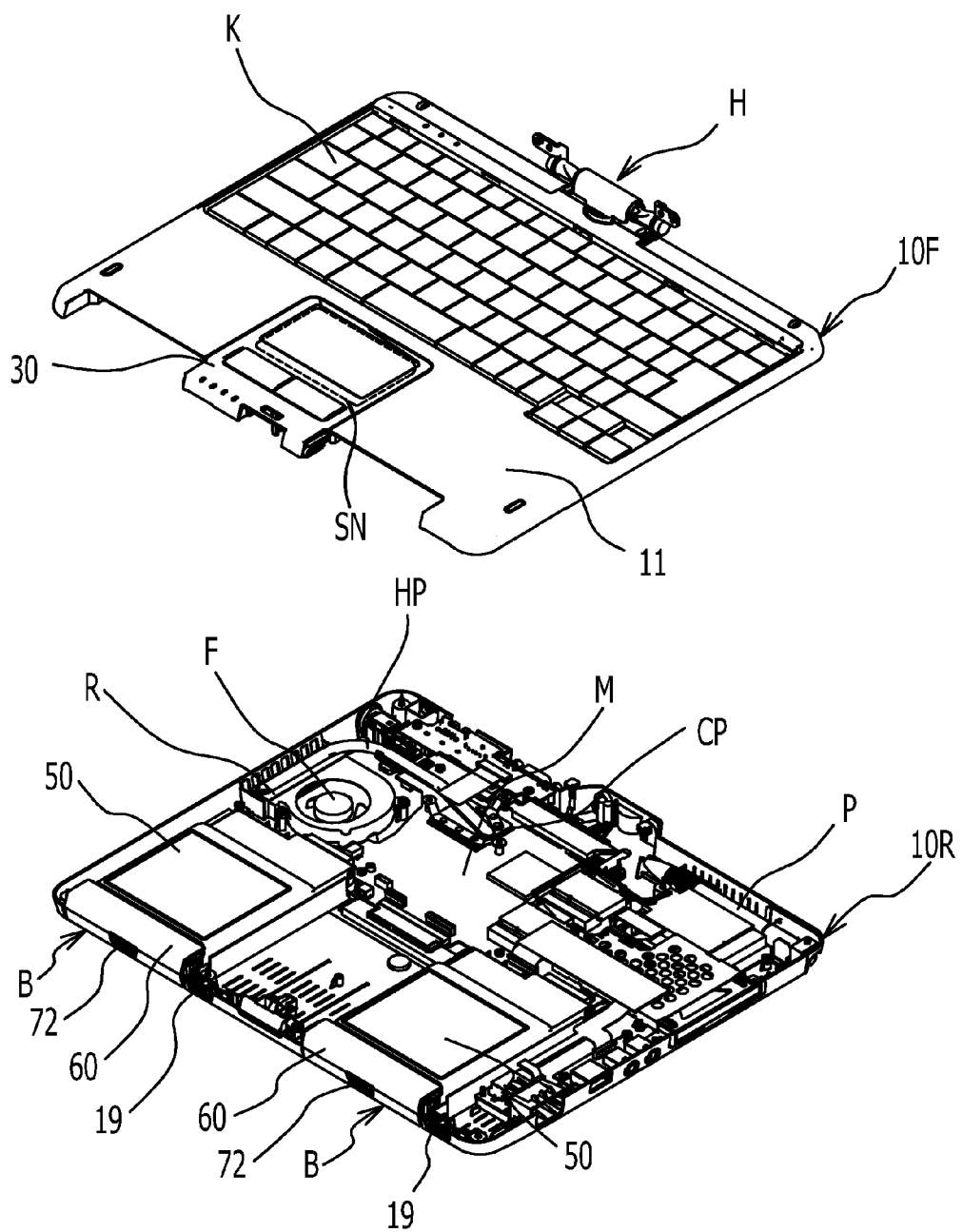
FIG. 2 is an exploded perspective view of a housing.

FIG. 2 is an exploded perspective view of the housing 10. The housing 10 includes cases 10F and 10R and a cover 30. The cases 10F and 10R are made of metal. The cover 30 is made of insulating material, and more specifically, it is made of synthetic resin. However, the material of the cover 30 is not limited to this. The cover 30 may be made, for example, of rubber. The cover 30 covers an electrostatic capacitance touch sensor SN. When the user's finger touches the cover 30, the touch sensor SN disposed inside the cover 30 detects the position of the user's finger. The cover 30 is attached to the case 10F. The upper surface 11 of the housing 10 is defined by the case 10F and the cover 30. The bottom surface 12 of the housing 10 is defined by the case 10R.

On the case 10R side, there are disposed a mother board M, a heat pipe HP that receives heat from a semiconductor chip CP mounted on the mother board M, a radiator R connected to the heat pipe HP, and a fan F that cools the radiator R. The case 10R houses a stylus pen P for operating the touch panel of the display unit U. In the case 10R, two housing members B are disposed. The two housing members B are housed in the housing 10 and are disposed on either side of the cover 30.

Most of the housing 10 is defined by the metal cases 10F and 10R. In general, metals are denser than insulating materials, and metals are stronger than insulating materials. Therefore, a housing formed of a thin metal sheet is strong but lightweight compared to a housing formed of insulating material. In this embodiment, most of the housing 10 is formed of metal, and therefore the strength and lightness of the housing 10 are ensured.

Figure 3:
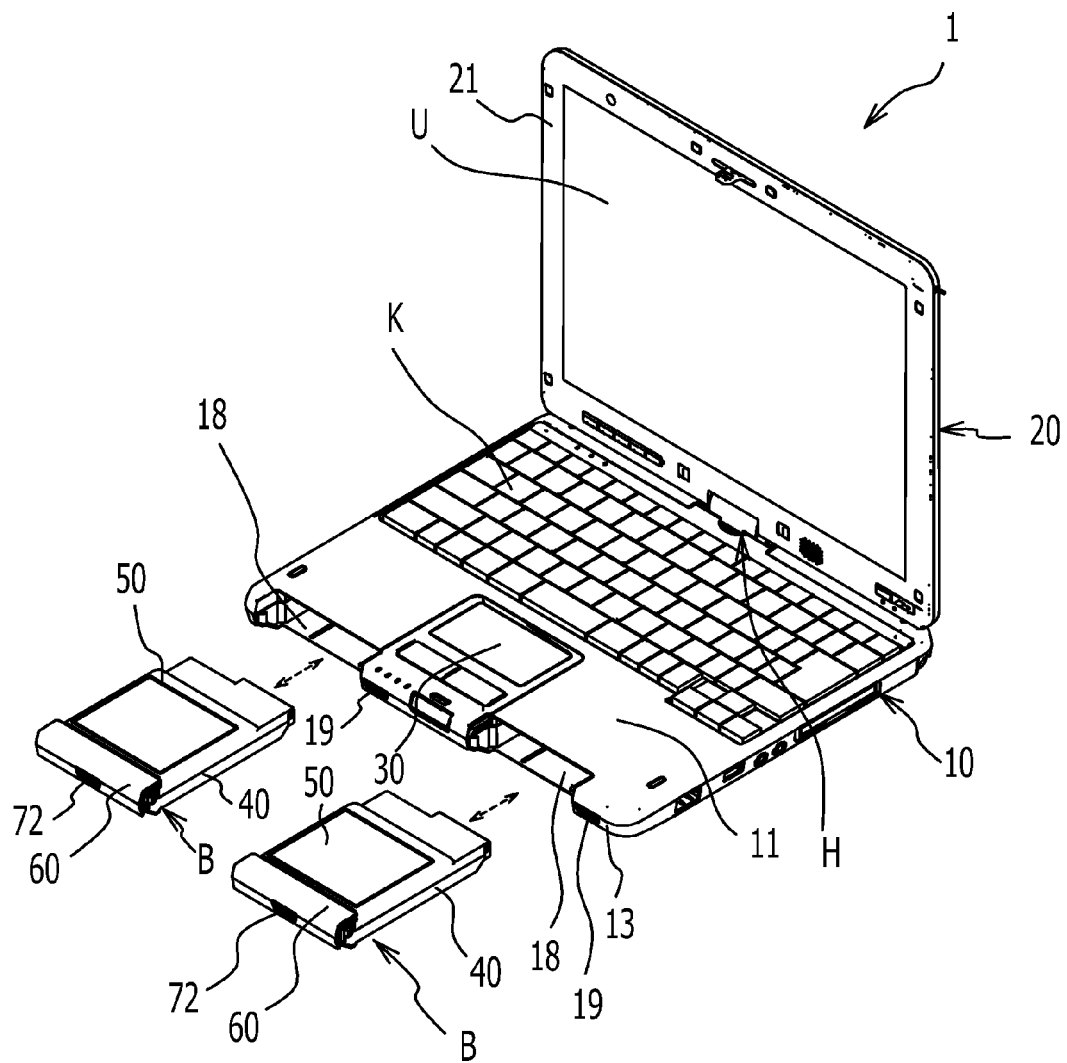
FIG. 3 is a perspective view of the notebook computer with housing members removed.

FIG. 3 is a perspective view of the notebook computer 1 with the housing members B removed. In the side surface 13 of the housing 10, insertion openings 18 are formed into which the housing members B may be inserted. On the side surface 13 of the housing 10, locking portions 19 for locking the housing members B are provided. By sliding the locking portions 19 in the longitudinal direction of the side surface 13 of the housing 10, the lock on the housing members B housed in the housing 10 is released. The housing members B may be completely removed from the housing 10. However, the housing members B do not necessarily have to be able to be completely removed from the housing 10 as long as the housing members B may be pulled out from the housing 10. The housing members B are an example of a housing member that is housed in the housing 10 so as to be able to be pulled out. The insertion openings 18 are an example of an opening into which the housing member B may be inserted.

Figure 4A:
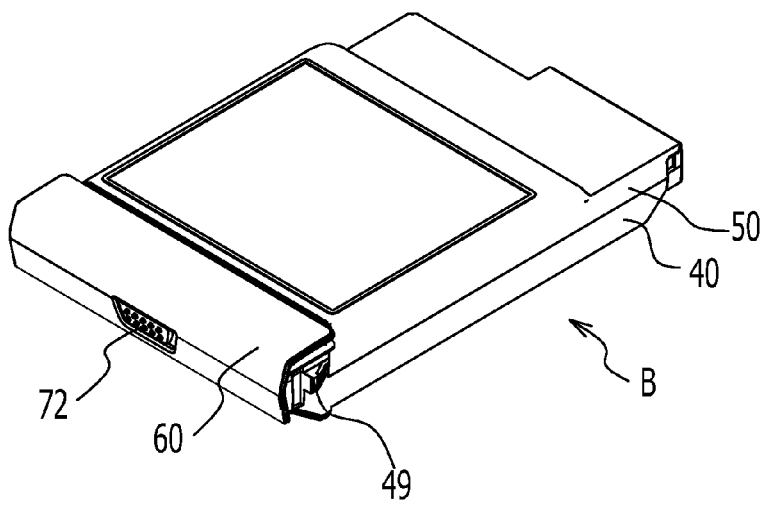
FIGS. 4A and 4B are perspective views of one of the housing members.
Figure 4B:
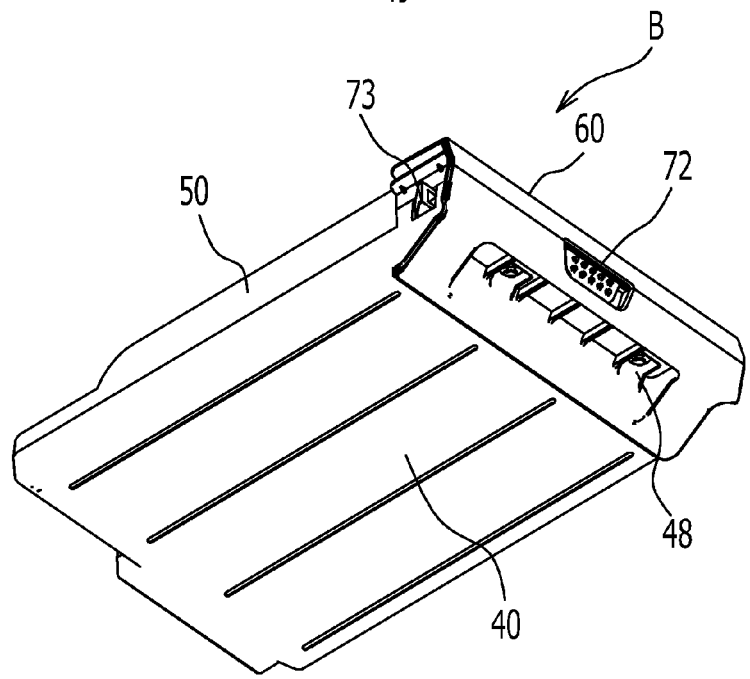
Figure 5:
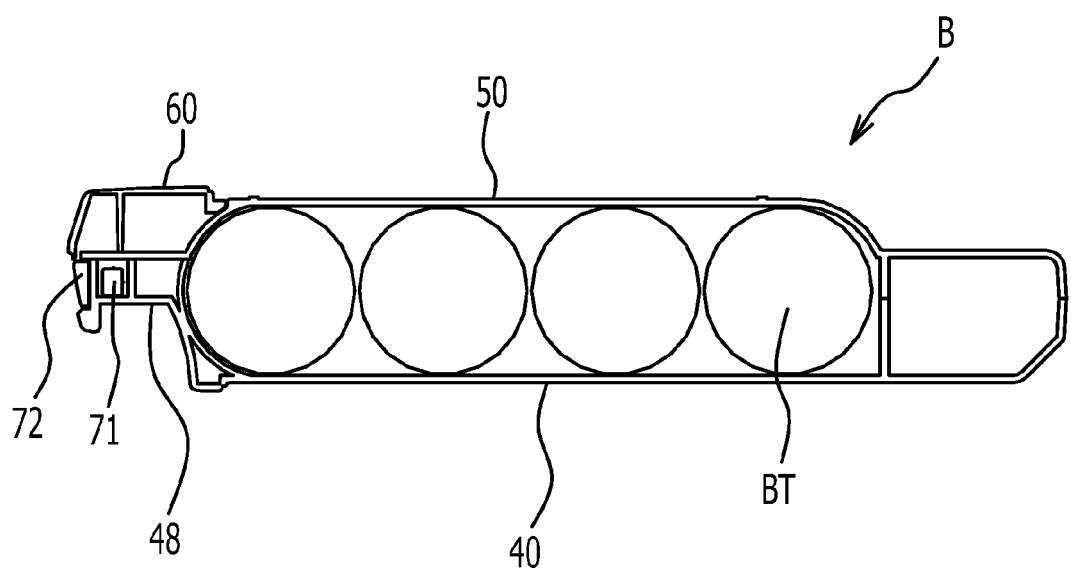
FIG. 5 is a sectional view of the housing member.
Figure 6:
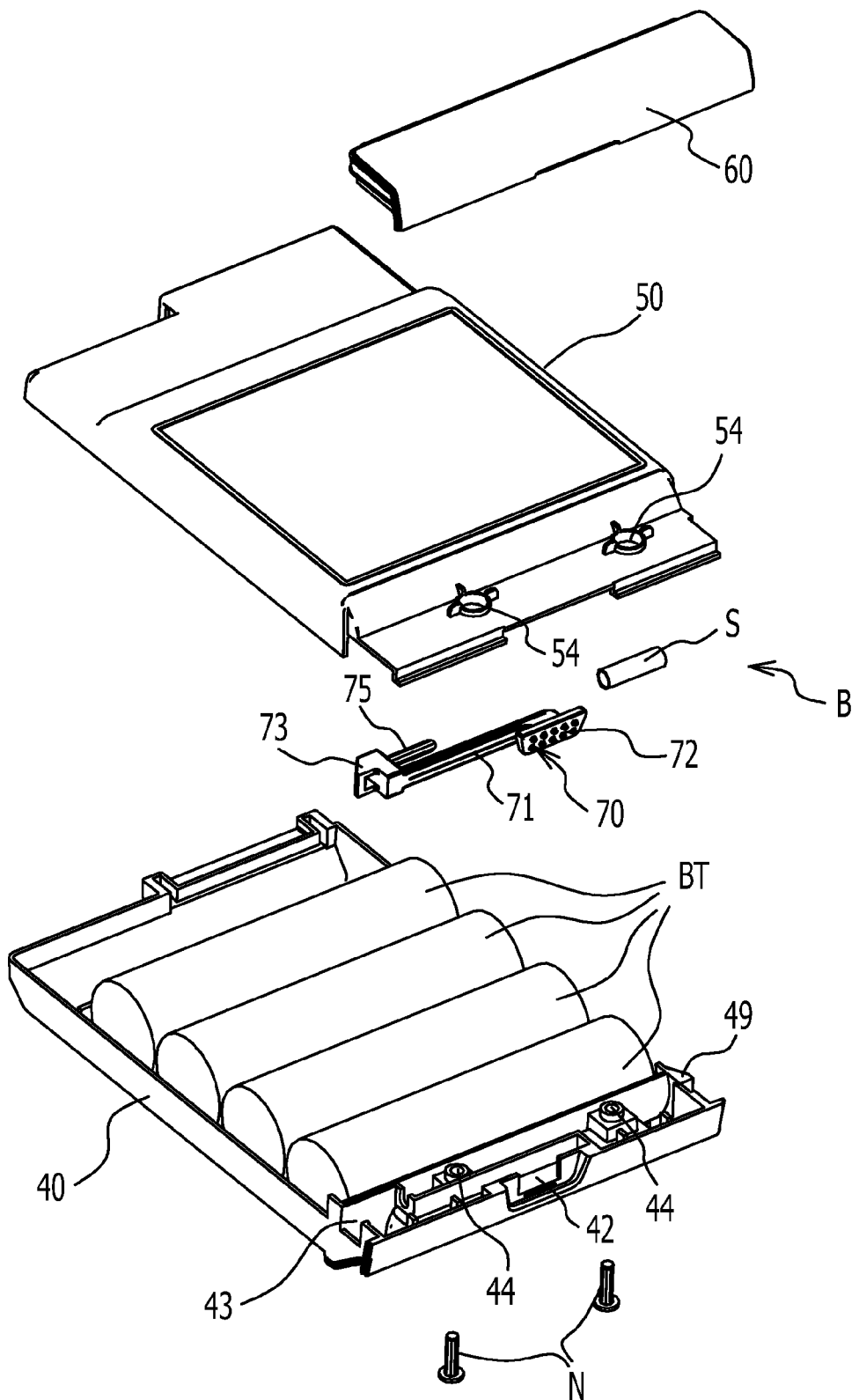
FIG. 6 is an exploded perspective view of the housing member.
Figure 7:
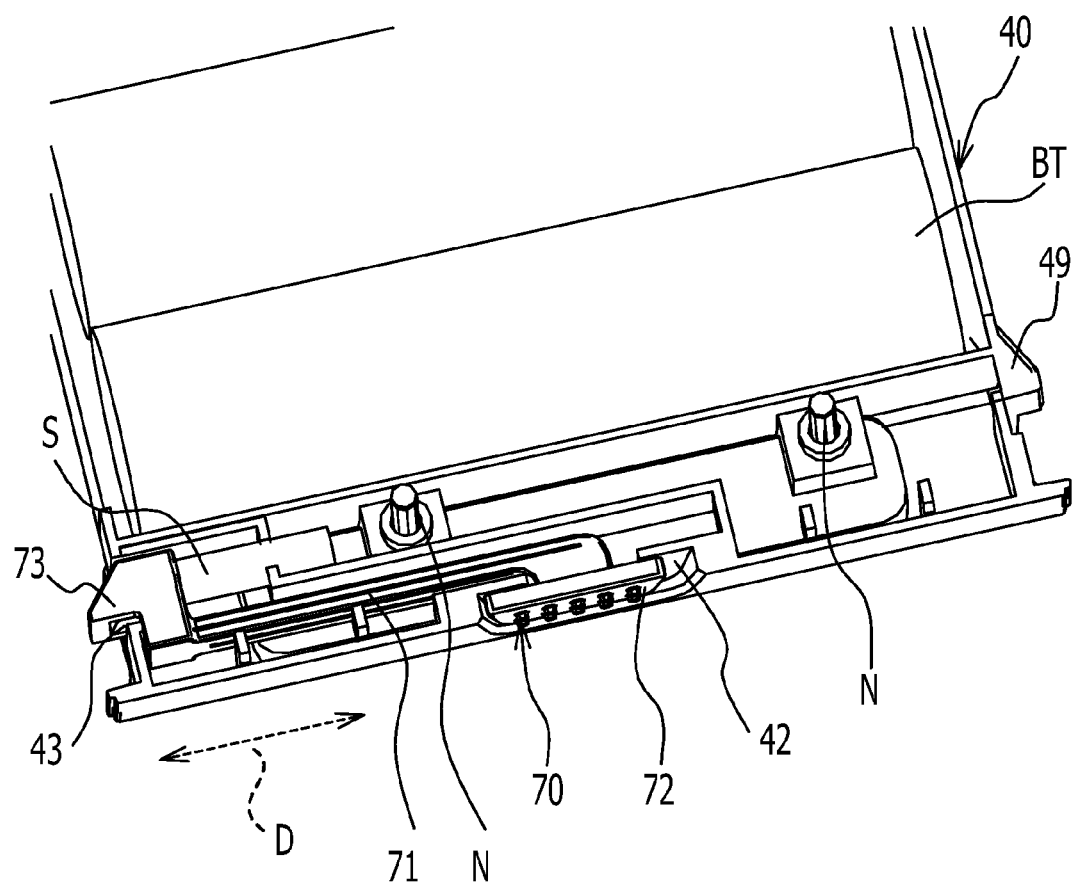
FIG. 7 is a partial enlarged view of the housing member in a state where a locking portion is attached to a lower case.

The housing members B will be described. FIGS. 4A and 4B are perspective views of one of the housing members B. FIG. 5 is a sectional view of the housing member B. FIG. 6 is an exploded perspective view of the housing member B. FIG. 7 is a partial enlarged view of the housing member B in a state where a locking portion 70 is attached to a lower case 40. The housing member B includes a lower case 40, an upper case 50, a lid 60, and a locking portion 70. The lower case 40, the upper case 50, the lid 60, and the locking portion 70 are made of insulating material, and more specifically, they are made of synthetic resin. The lower case 40 and the upper case 50 are assembled together and house batteries BT. All most of parts of the batteries BT are made of metal. As illustrated in FIG. 5, in the front of the lower case 40, a recess 48 is formed into which the user's fingers are inserted when the user manually removes the housing member B.

As illustrated in FIG. 6, through-holes 44 and 54 are formed in the lower case 40 and the upper case 50, respectively. Screw holes are formed in the lid 60. Screws N inserted into the through-holes 44 and 54 are screwed into the screw holes of the lid 60. Thus, the upper case 50 is fixed to the lower case 40, and the lid 60 is fixed to the upper case 50.

As illustrated in FIGS. 6 and 7, a protruding engaging portion 49 is formed on the side surface of the front portion of the lower case 40. When the housing member B is housed in the housing 10, the engaging portion 49 engages with the locking portion 19 of the housing 10, and makes it impossible to remove the housing member B from the housing 10. The locking portion 19 is an example of a locking portion that is disengageably engaged with the housing member.

As illustrated in FIGS. 6 and 7, the locking portion 70 is slidably held between the lower case 40 and the upper case 50. The locking portion 70 includes an extending portion 71, an operating portion 72, an engaging portion 73, and a pin portion 75. The extending portion 71 extends in a predetermined direction. The operating portion 72 is provided at one end of the extending portion 71, and is exposed through a cutout 42 formed in the center of the front of the lower case 40. The engaging portion 73 is a protrusion provided at the other end of the extending portion 71, and is exposed through a cutout 43 formed in the front portion of the side surface of the lower case 40. The engaging portion 73 of the locking portion 70 engages with the housing 10 when the housing member B is housed in the housing 10. The pin portion 75 extends parallel to the extending portion 71 from the engaging portion 73. The pin portion 75 is inserted into a coil spring S.

As illustrated in FIG. 7, the spring S urges the locking portion 70 attached to the lower case 40 in an urging direction D. Thus, when the housing member B is housed in the housing 10, the engagement between the engaging portion 73 of the locking portion 70 and the housing 10 is maintained, and it becomes impossible to remove the housing member B. The locking portion 70 is an example of a locking portion that is disengageably engaged with the first housing. The user slides the locking portion 19 of the housing 10 and thereby releases the lock between the housing 10 and the housing member B. In addition, the user slides the operating portion 72 of the locking portion 70 in a direction opposite to the urging direction D of the spring S and thereby releases the lock between the locking portion 70 and the housing 10. Thus, the housing member B is removed from the housing 10.

As illustrated in FIGS. 1A to 1C and FIG. 2, the lids 60 of the housing members B housed in the housing 10 are exposed. In other words, the lids 60 cover the insertion openings 18 of the housing 10 when the housing members B are housed in the housing 10. The side surface 13 of the housing 10 is defined by part of the housing 10, the cover 30, and the lids 60 of the housing members B. The lid 60 is an example of an exposed portion that is exposed on the surface of the first housing when housed in the first housing and that is made of insulating material.

Figure 8:
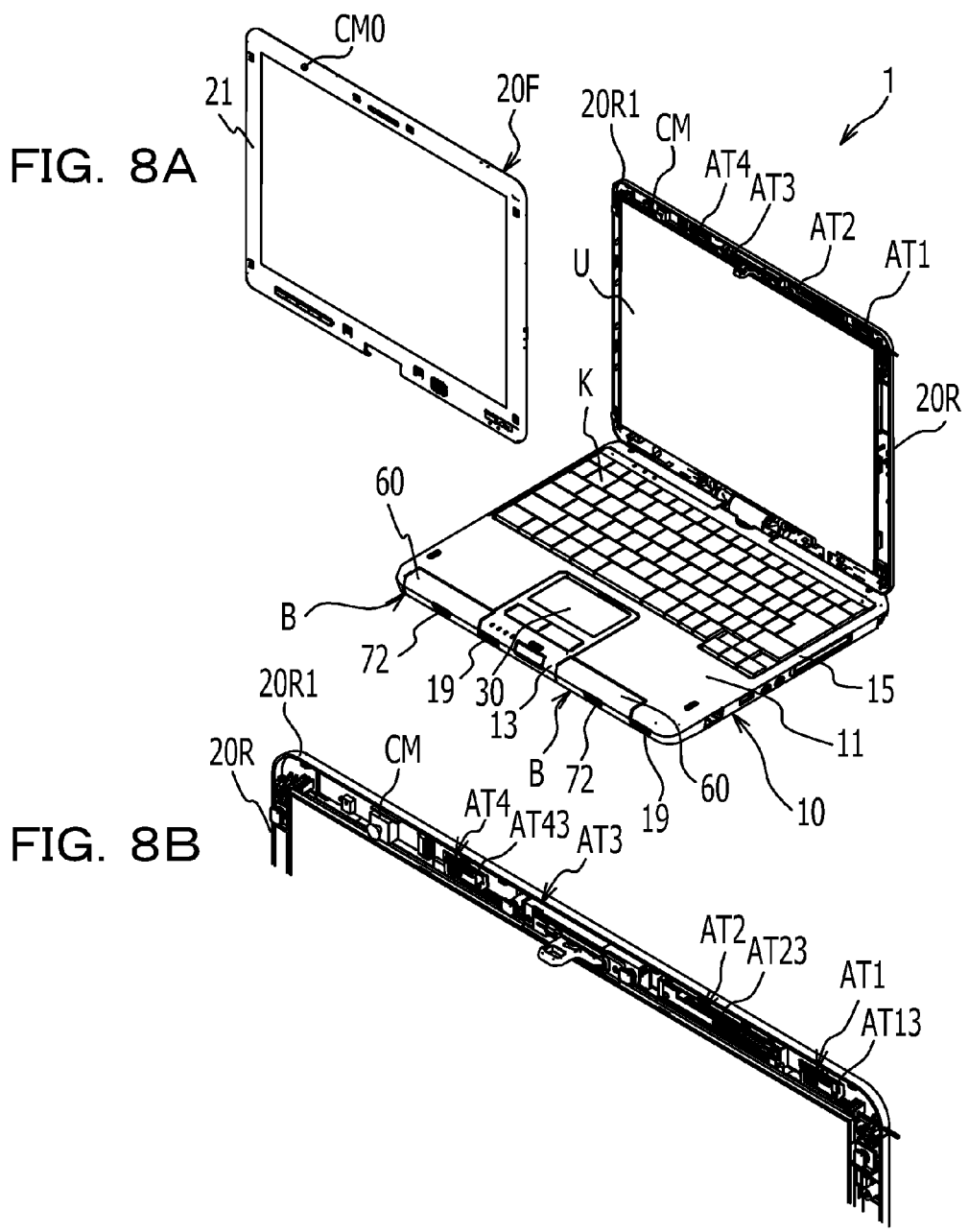
FIG. 8A is a perspective view of the notebook computer with a housing disassembled.
FIG. 8B is a partial enlarged view of FIG. 8A.

Next, antennas housed in the housing 20 will be described. FIG. 8A is a perspective view of the notebook computer 1 with the housing 20 disassembled. FIG. 8B is a partial enlarged view of FIG. 8A. The housing 20 includes a case 20F disposed at a front side, a case 20R disposed at a back side, and a cover 20R1. The case 20F defines a front surface 21. The case 20R and the cover 20R1 define a back surface 22. The case 20F and the cover 20R1 are made of insulating material, and more specifically, they are made of synthetic resin. The case 20F and the cover 20R1 are an example of a wall portion made of insulating material. At least one of the case 20F and the cover 20R1 may be made, for example, of rubber. The case 20R is made of metal. The cover 20R1 is located above the case 20R. The case 20F and the cover 20R1 define the side surface 23 of the housing 20. Antennas AT1 to AT4 and a camera unit CM are disposed inside the cover 20R1.

Figure 9:
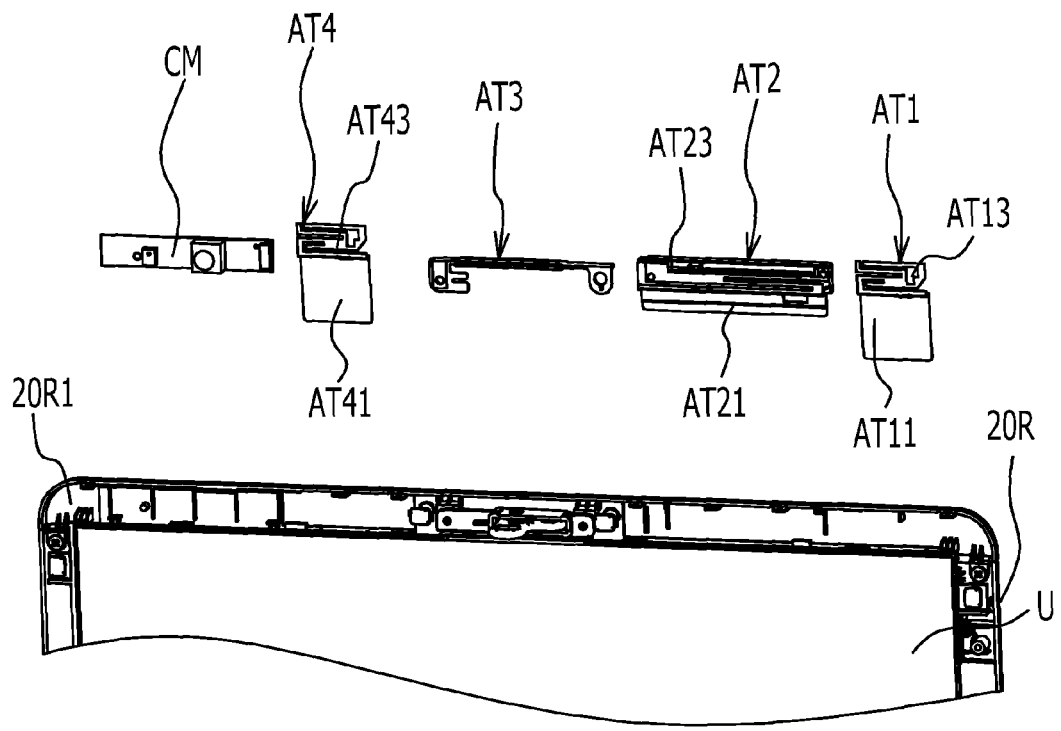
FIG. 9 illustrates a state where antennas and a camera unit are removed from a case and a cover of the housing.

FIG. 9 illustrates a state where the antennas AT1 to AT4 and the camera unit CM are removed from the case 20R and the cover 20R1 of the housing 20. The antennas AT1, AT2, and AT4 have ground portions AT11, AT21, and AT41, respectively, in their lower portions. The ground portions AT11, AT21, and AT41 are electrically connected to a metal plate fixed to the back surface of the display unit U. The antennas AT1, AT2, and AT4 have radiation portions AT13, AT23, and AT43, respectively, in their upper portions. The radiation portions AT13, AT23, and AT43 are not connected to the metal plate to which the ground portions AT11, AT21, and AT41 are connected. As illustrated in FIG. 8B, the radiation portions AT13, AT23, and AT43 of the antennas AT1, AT2, and AT4, and the antenna AT3 are surrounded by the case 20F and the cover 20R1 made of synthetic resin.

Therefore, the antennas AT1 to AT4 are an example of an antenna at least part of which is housed in the second housing and surrounded by the wall portion. In general, if a member made of metal is near an antenna, the receiving sensitivity of the antenna is reduced. Since at least part of each of the antennas AT1 to AT4 of this embodiment is surrounded by the case 20F and the cover 20R1 made of synthetic resin, the reduction of the receiving sensitivity of the antennas AT1 to AT4 in a deployed state is suppressed.

As described above, metals are denser than insulating materials, and metals are stronger than insulating materials. Therefore, a housing formed of a thin metal sheet is strong but lightweight compared to a housing formed of insulating material. In this embodiment, the case 20R that is part of the housing 20 is made of metal, and therefore the strength and lightness of the housing 20 are ensured. In addition, the case 20F and the cover 20R1 that are each part of the housing 20 are made of insulating material, and therefore the reduction of the receiving sensitivity of the antennas AT1 to AT4 is sup- pressed. As illustrated in FIG. 8A, an opening CMO through which the lens of the camera unit CM is exposed is formed in the case 20F.

Figure 10:
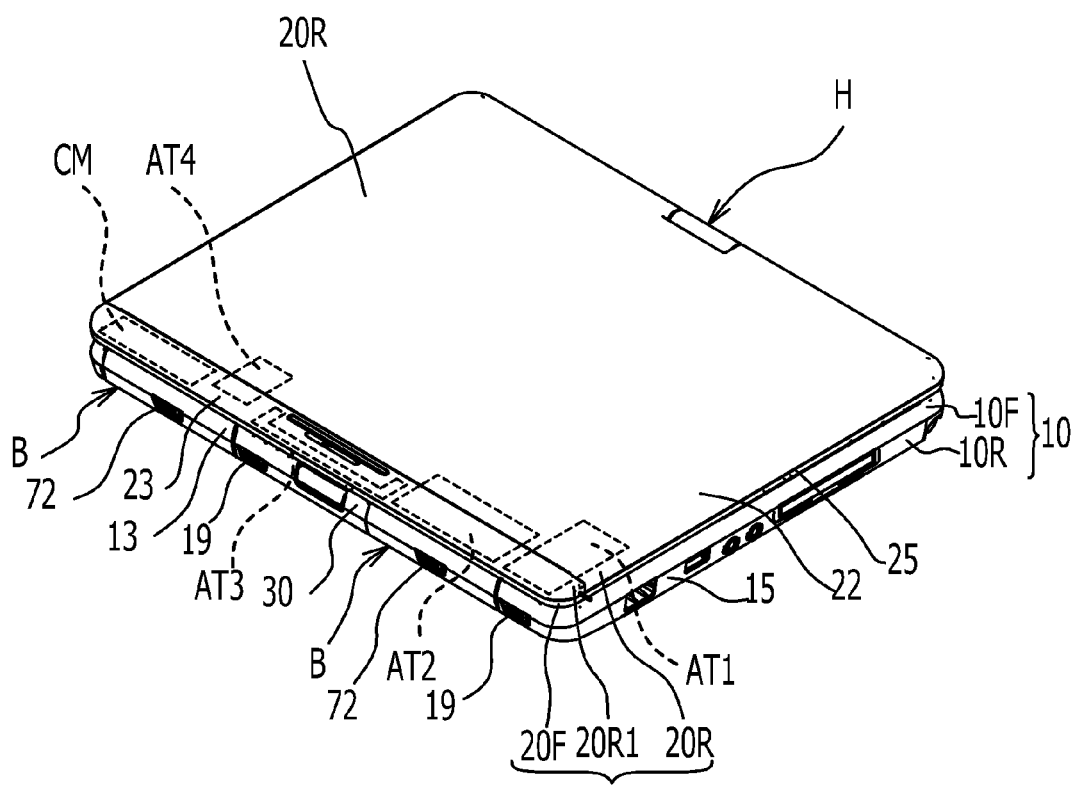
FIG. 10 is a perspective view of the notebook computer in a first superimposed state illustrating the positions of the antennas and the camera unit.

FIG. 10 is a perspective view of the notebook computer 1 in the first superimposed state illustrating the positions of the antennas AT1 to AT4 and the camera unit CM. FIG. 10 illustrates the antennas AT1 to AT4 and the camera unit CM. In the first superimposed state, the antennas AT2 and AT4 face the lids 60 of the housing members B made of synthetic resin with the case 20F made of synthetic resin therebetween. In other words, in the first superimposed state, the antennas AT2 and AT4 do not face the batteries BT and the case 10F made of metal with the case 20F therebetween.

If the antennas AT2 and AT4 face members made of metal with the case 20F therebetween, the receiving sensitivity of the antennas AT2 and AT4 is reduced. However, actually the antennas AT2 and AT4 do not face the batteries BT and the case 10F made of metal. Therefore, also in the first superimposed state, the reduction of the receiving sensitivity of the antennas AT2 and AT4 is suppressed. In the first superimposed state, the antenna AT3 faces the cover 30. As described above, the cover 30 is made of synthetic resin. Thus, also in the first superimposed state, the reduction of the receiving sensitivity of the antenna AT3 is suppressed. In this way, the reduction of the receiving sensitivity of the antennas AT1 to AT3 is suppressed in the first superimposed state. In the first superimposed state, the opening CMO is covered by the housing 10, and therefore the camera unit CM may not be used.

Figure 11:
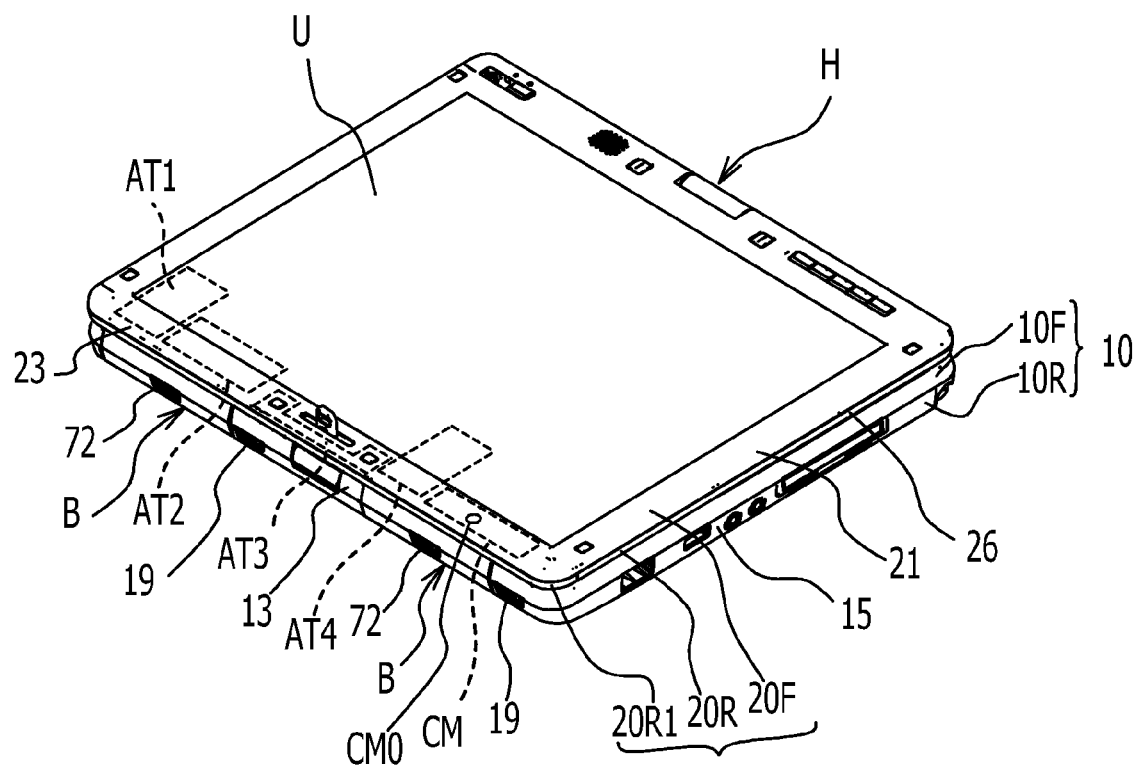
FIG. 11 is a perspective view of the notebook computer in a second superimposed state illustrating the positions of the antennas and the camera unit.
Figure 12:
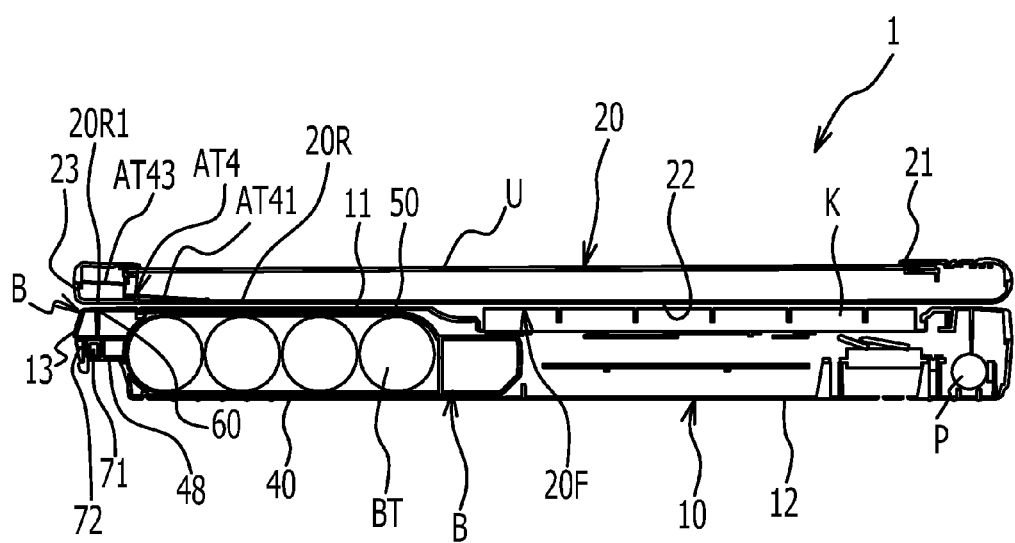
FIG. 12 is a sectional view of the notebook computer in the second superimposed state.

FIG. 11 is a perspective view of the notebook computer 1 in the second superimposed state illustrating the positions of the antennas AT1 to AT4 and the camera unit CM. FIG. 12 is a sectional view of the notebook computer 1 in the second superimposed state. Also in the second superimposed state, the antennas AT1 to AT4 face the housing members B or the cover 30 made of synthetic resin with the case 20R1 made of synthetic resin therebetween. Therefore, in the second superimposed state, the reduction of the receiving sensitivity of the antennas AT1 to AT4 is suppressed. As described above, the reduction of the receiving sensitivity of the antennas AT1 to AT4 is suppressed in any state. In the second superimposed state, the opening CMO faces the opposite direction from the housing 10, and therefore the camera unit CM may be used.

Figure 13:
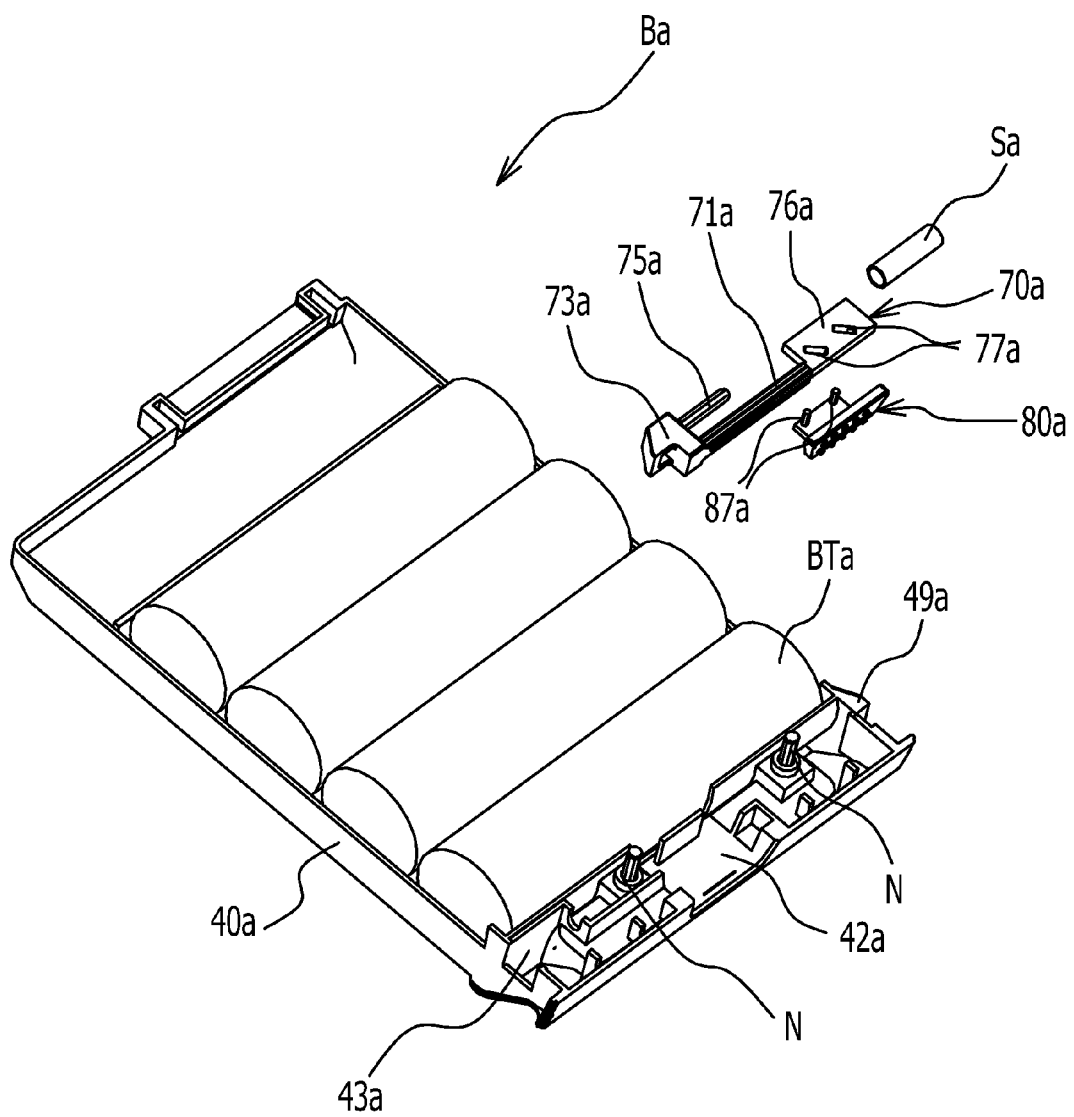
FIG. 13 is an explanatory view of a housing member that is a first modification.
Figure 14:
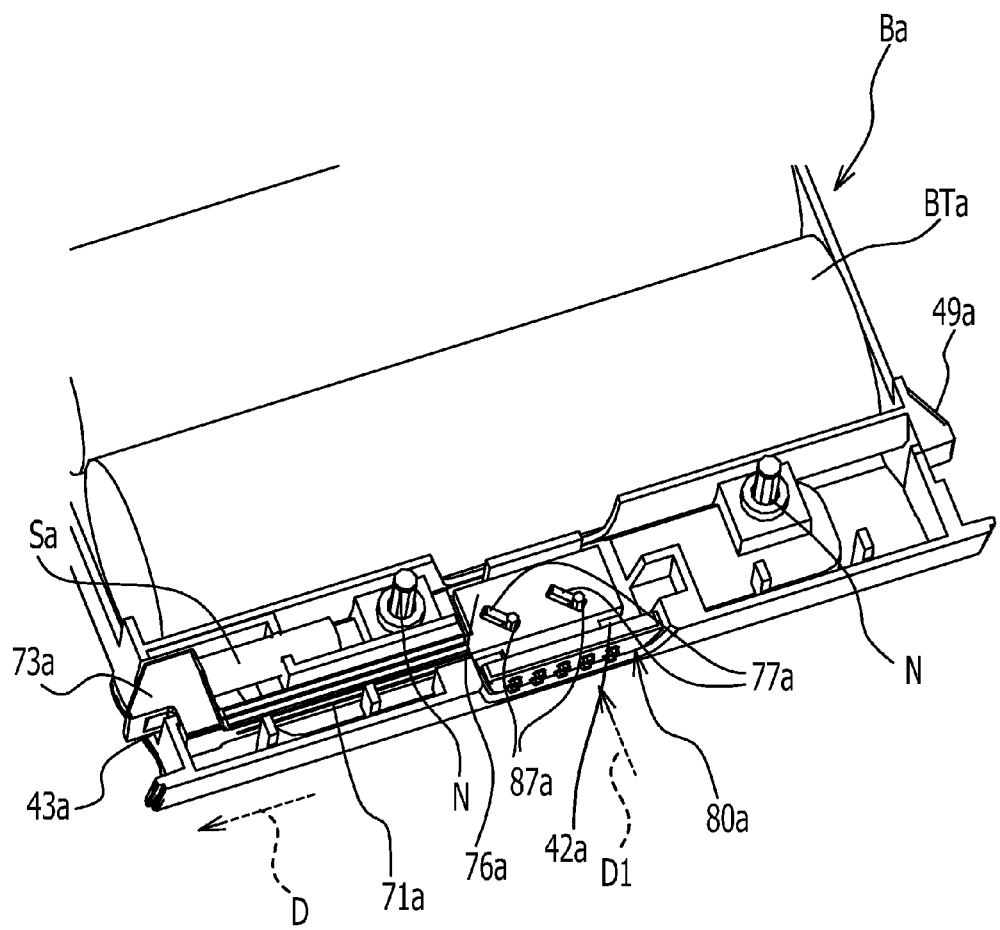
FIG. 14 is a partial enlarged view of the housing member of the first modification in a state where a locking portion is attached to a lower case.

FIG. 13 is an explanatory view of a housing member Ba that is a first modification. The upper case 50 and the lid 60 of the housing member Ba are not illustrated. FIG. 14 is a partial enlarged view of the housing member Ba of the first modification in a state where a locking portion 70a is attached to a lower case 40a. An operating portion 80a is provided with two guide pins 87a protruding in the vertical direction. At one end of an extending portion 71a of the locking portion 70a, a plate-like connecting portion 76a parallel to the horizontal direction is formed. In the connecting portion 76a, two guide grooves 77a are formed that are slidably engaged with the guide pins 87a. The guide grooves 77a extend at an angle to the urging direction D of a spring Sa. The user presses the operating portion 80a in a direction D1 perpendicular to the urging direction D of the spring Sa, and thereby the guide pins 87a of the operating portion 80a move in the guide grooves 77a. Thus, the locking portion 70a moves in a direction opposite to the urging direction D of the spring Sa, and the lock between the housing 10 and the locking portion 70a is released.

Figure 15:
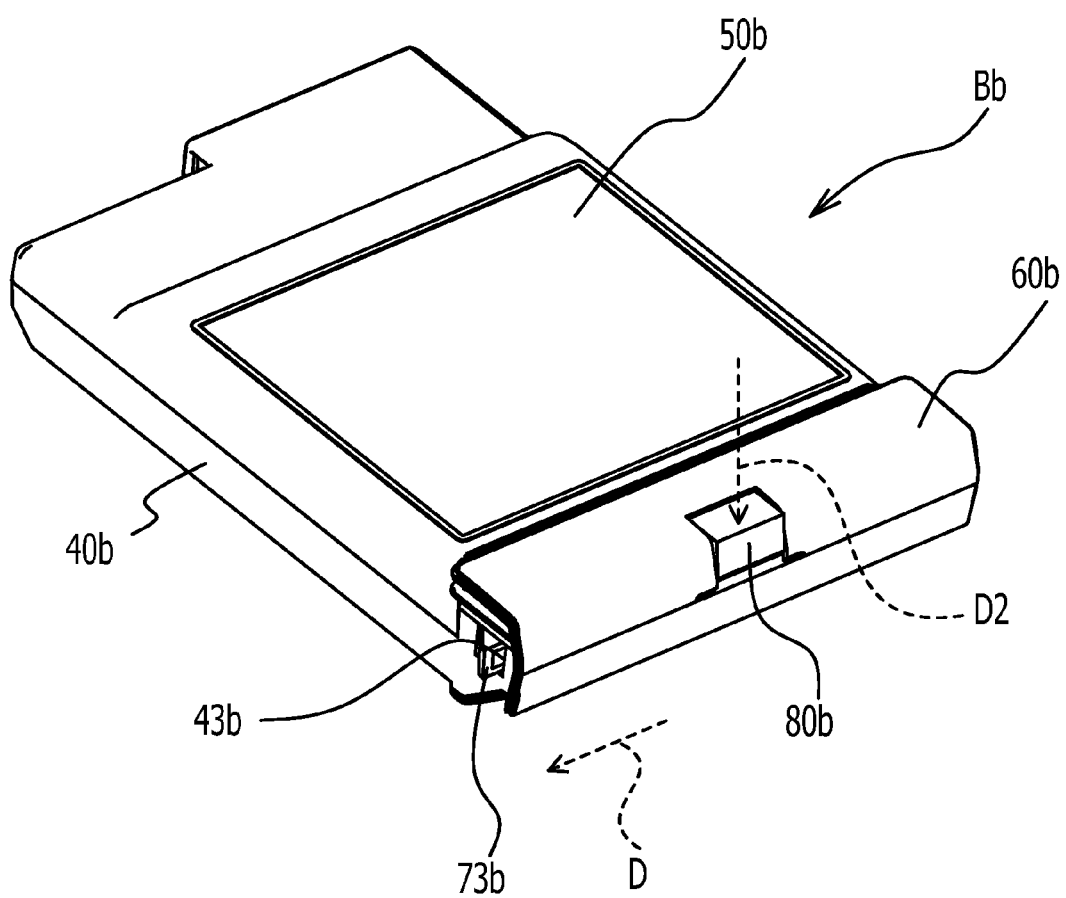
FIG. 15 is an explanatory view of a housing member that is a second modification.
Figure 16:
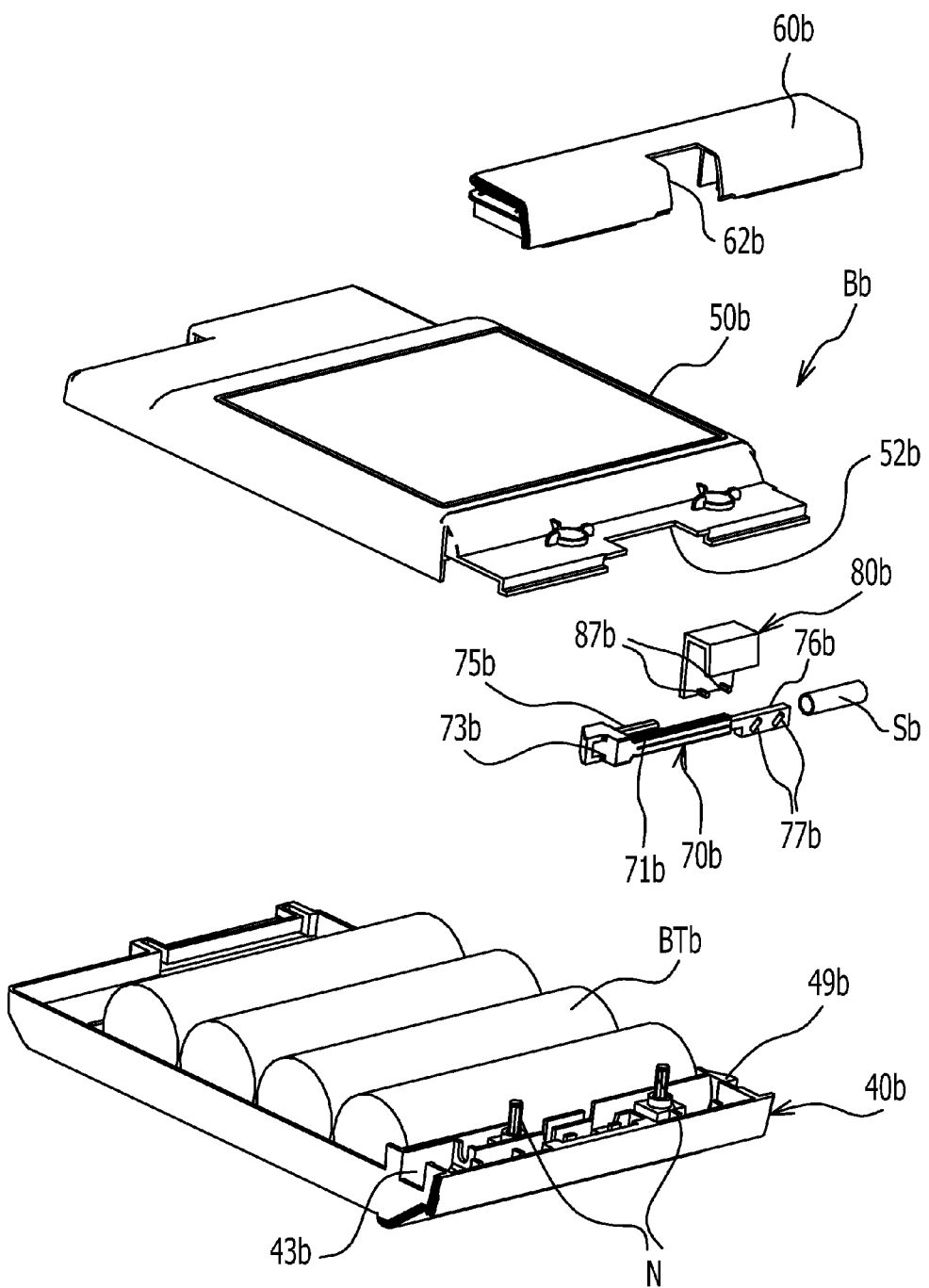
FIG. 16 is an exploded perspective view of the housing member that is the second modification.

FIG. 15 is an explanatory view of a housing member Bb that is a second modification. FIG. 16 is an exploded perspective view of the housing member Bb that is the second modification. An operating portion 80b has two guide pins 87b protruding in the horizontal direction and toward the front of the housing member Bb. An upper case 50*b* has a cutout 52*b* formed therein. A lid 60*b* has a cutout 62*b* formed therein. The operating portion 80*b* is disposed in the cutouts 52*b* and 62*b*. At one end of an extending portion 71*b* of a locking portion 70*b*, a connecting portion 76*b* is formed. In the connecting portion 76*b*, two guide grooves 77*b* are formed that are slidably engaged with the guide pins 87*b*. The guide grooves 77*b* extend at an angle to the vertical direction. The user presses the operating portion 80*b* in a vertically downward direction D2 perpendicular to the urging direction D of a spring Sb, and thereby the guide pins 87*b* of the operating portion 80*b* move in the guide grooves 77*b*. Thus, the locking portion 70*b* moves in a direction opposite to the urging direction D of the spring Sb, and the lock between the housing 10 and the locking portion 70*b* is released.

Although a preferred embodiment of the present invention has been described, it is to be understood that the present invention is not intended to be limited to the above-described specific embodiment, and various changes may be made without departing from the scope of the present invention set forth in the appended claims.

In the above embodiment, a notebook computer has been described as an example of a portable device. However, the present invention may be applied to any other portable device, for example, a cellular phone, a portable television, an electronic dictionary, a PDA, a game machine, a camera, a music player, or a navigation device.

In the above embodiment, a housing member B holding batteries BT has been described as an example of a housing member. However, a housing member B is not limited to this. For example, a housing member B may be a tray that may hold at least one of a flash memory, a hard disk, and a storage medium.

In the above embodiment, at least one of the antennas AT1 to AT4 may face both the lid 60 of the housing member B and the cover 30 with the case 20F therebetween in the first superimposed state.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A portable device comprising:
a first housing;
a housing member removable from the first housing, the housing member including an exposed portion, the exposed portion projecting from the first housing when the housing member is inserted in the first housing;
a second housing coupled with the first housing so as to be allowed to be folded on the first housing, the second housing including a wall made of electrical insulating material; and
an antenna disposed in the second housing and surrounded partially with the wall, a part of the antenna and the exposed portion facing each other via the wall when the first and second housings are folded on each other,
wherein the wall made of electrical insulating material is disposed between the part of the antenna and the exposed portion when the first and second housings are folded on each other.

2. The portable device according to claim 1, wherein the second housing further includes a first surface and a second surface, the first surface and the second surface being opposed each other, and the first and second housings are allowed to be folded on each other in a state in which the first surface faces the first housing or the second surface faces the first housing.

3. The portable device according to claim 1, wherein the part of the antenna is disposed at a position other than an overlapping position at which the antenna is overlapped with an battery, included in the first housing, via the wall when the first and second housings are superimposed each other.

4. The portable device according to claim 1, wherein the first housing includes a third surface, a fourth surface, and a fifth surface, the third surface being opposite to the fourth surface, the fifth surface coupling the third surface with the fourth surface, the fifth surface being provided with an insertion opening through which the housing member is inserted.

5. The portable device according to claim 1, wherein the housing member includes a lock detachably secured to the first housing.

6. The portable device according to claim 1, wherein the first housing includes a lock which allows the housing member to remove from and to be secured to the first housing.

7. The portable device according to claim 1, wherein the first housing includes a cover made of electrical insulating material, the cover sheathing a touch sensor, the cover contacts the exposed portion when the housing member is inserted in the first housing, and the antenna faces the exposed portion and the cover when the first and second housings are superimposed each other.

* * * * *